April 9, 1963
C. R. BROUGHTON
3,084,416
CUTTING TOOL
Filed Dec. 28, 1959
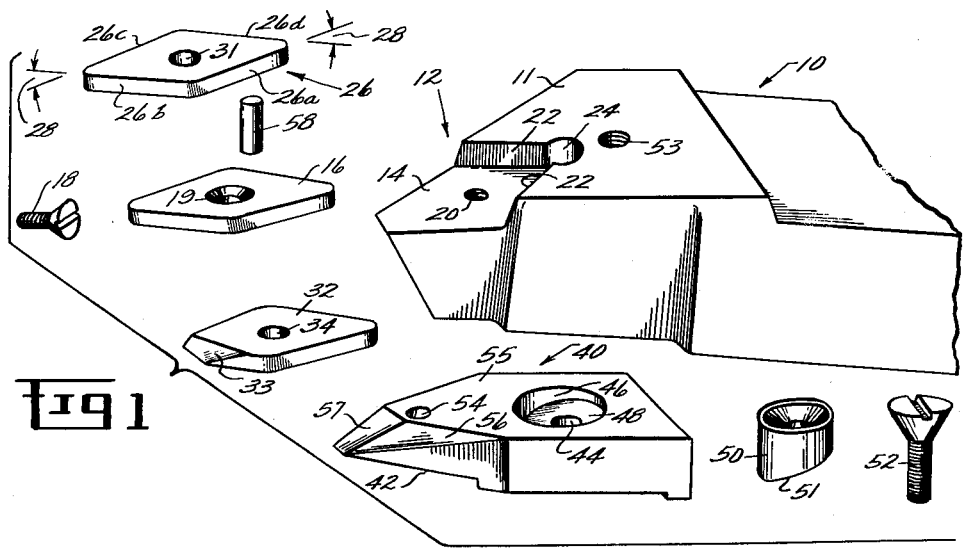
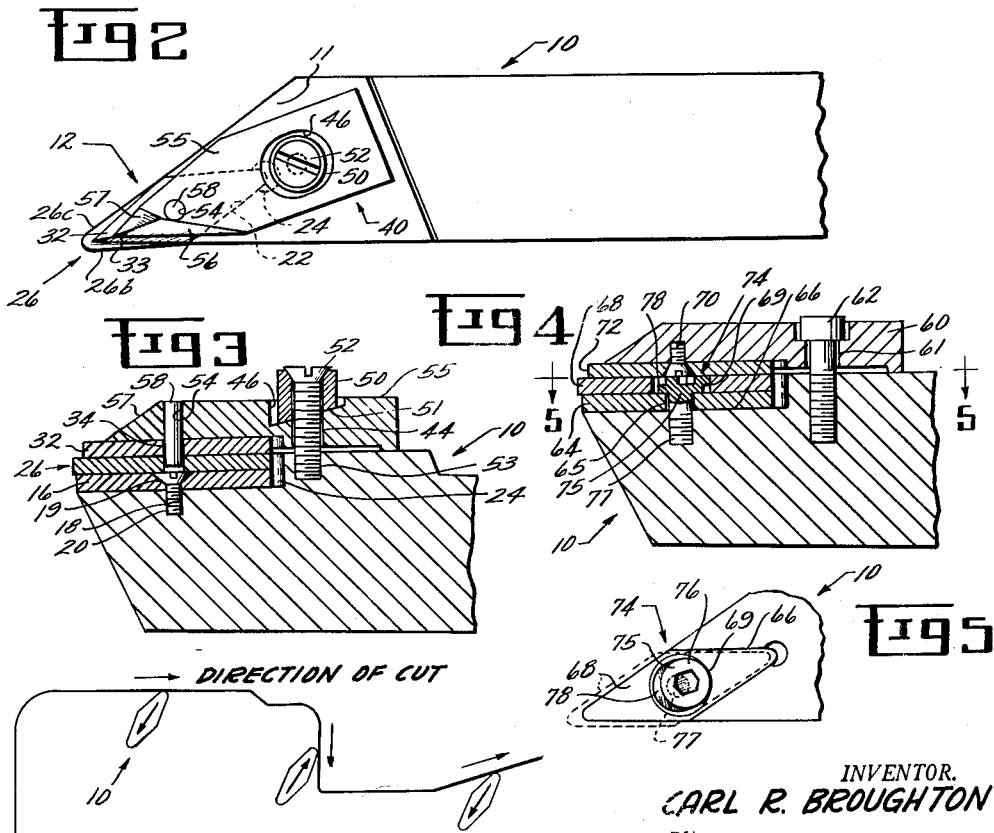
INVENTOR.
CARL R. BROUGHTON
BY
Harry C. Burgess
ATTORNEY—

United States Patent Office 3,084,416
Patented Apr. 9, 1963

3,084,416
CUTTING TOOL
Carl R. Broughton, Glendale, Ohio, assignor to General
Electric Company, a corporation of New York
Filed Dec. 28, 1959, Ser. No. 862,207
2 Claims. (Cl. 29—96)

This invention relates to an improvement in cutting tools and, more particularly, to an improved cutting tool having a disposable cutting element.

Most of the cutting tools in use today fall into two general classes: (1) the so-called "clamp-on" tool in which the cutting element, in the form of a disposable bit or tip, is attached to a tool shank or holder by means of a clamp and socket arrangement, and (2) the type of tool in which the cutting element is more or less permanently affixed, e.g., by brazing, to the tool shank.

There are certain difficulties connected with use of presently available tools of either of the above types. For example, cutting elements now in wide use in clamp-on tools have an included angle of at least 55°, i.e., the angle between adjacent sides of the element, of which at least one side is the cutting edge, is no less than 55°. Indeed, in most instances, the included angle is upwards of 75°. Many attempts have been made, with little commercial success, however, to bring this included angle down to a size such that the cutting tool can be used for intricate machining operations where tolerances are critical and clearances are apt to be slight. The difficulty stems from the fact that most clamp-on tool holders depend primarily on downward pressure of the clamping member to hold the bit in place and, as the bit becomes smaller, more and more localized pressure is required. Since even the slightest movement will usually cause a part to be scrapped because of the close tolerances, as the included angle lessens it becomes even harder to prevent a part-destroying shift of the cutting element. Consequently, prior to the instant invention, it was thought impossible to make a reliable clamp-on cutting tool having a disposable bit with much less than 55° included angle.

To machine an intricately-contoured part, therefore, specially-designed tool holders having a brazed, or otherwise permanently affixed bit have been used. This type of tool also has certain disadvantages. For example, a brazed tool provides only one or, at best, two cutting faces; thus when the cutting element is dulled, the entire set-up usually must be torn down for removal and replacement of the tool holder. This requires that many measurements be retaken and tolerances re-calibrated before the machining operation can continue. Obviously brazed tools are therefore relatively expensive since, besides the fact there are a limited number of cutting edges per tool, which may necessitate the use of a large number of tools to machine a particular part, the time spent in replacing the tool holder and readjusting the machine can be quite costly.

Accordingly, an object of this invention is to provide an improved cutting tool having a disposable cutting element.

A further object of this invention is to provide a more reliable and economical cutting tool having a disposable bit.

Another object of the invention is to provide a more reliable and economical cutting tool having a disposable cutting element capable of machining intricately-contoured and relatively small parts.

Briefly stated, in accordance with one aspect of my invention, I provide a cutting tool including a tool holder having means to receive and retain a disposable cutting element having at least one cutting edge and also having an included angle of approximately 35°, a clamping member adapted to exert downward pressure on the cutting element, detachable means releasably securing the clamping member to the holder, and wedging means in the form of a cammed bolt cooperating with the clamping member to rigidly secure the element to the tool holder.

While the specification concludes with claims particularly pointing out and distinctly claiming the subject matter which I regard as my invention, it is believed the invention will be better understood, and other objects and advantages of the invention become more apparent, from the following description taken in connection with the accompanying drawings in which:

FIG. 1 is a pictorial view of one embodiment of my novel cutting tool with disposable bit in a disassembled relationship; and FIG. 2 is a top view of the cutting tool with the bit in position preparatory to the cutting operation; and FIG. 3 is an elevation, partly in cross-section, of the embodiment shown in FIG. 1 illustrating one manner by which the cutting element can be securely held on the tool shank; and FIG. 4 is an elevation, partly in cross-section, of a further embodiment of my improved cutting tool; and FIG. 5 is a view taken on line 5—5 of FIG. 4; and FIG. 6 is a schematic diagram illustrating some of the forces at work on a cutting tool bit during a typical contour cut.

Referring now to the drawings, FIG. 1 depicts various parts of an embodiment of my improved cutting tool and bit assembly in a disassembled relationship. Illustrated generally at 10 is a tool shank or holder preferably constructed of hardened tool steel. The tool shank has a tapered forward portion 11 containing a cutting element recess or pocket, indicated generally at 12. The bottom surface 14 of the recess acts as a platform to support a seat plate 16. The seat plate is adapted to be secured to the platform by suitable fastening means, such as a set screw 18 adapted to pass through a smooth hole 19 in the plate and then engaged with a threaded hole 20 in the tool holder body. The pocket 12 is also provided with a pair of vertical convergent walls 22—22 which meet in a clearance hole 24 at the rear of the pocket. The hole is provided to permit intimate contact between the vertical walls and the cutting element as described below.

Indicated generally at 26 is a cutting element or bit adapted to seat on the plate 16. The bit preferably has four cutting faces which are indicated at 26a, 26b, 26c, and 26d, respectively, in accordance with one of the objects of my invention, namely, to provide a more economical and efficient cutting tool. For purposes of description, the cutting faces subtending the smaller included angles 28—28 of the element will be referred to as "paired" faces. The cutting element is also provided with a smooth hole or bore 31 for a purpose hereinafter described.

A further element of my cutting tool assembly consists of a chipbreaker 32 adapted to fit on top of the cutting element. The chipbreaker contains an angled surface 33 to facilitate peeling back of the sheared material during the cutting operation. The chipbreaker also has a bore 34 adapted to be aligned with the aforementioned bit bore, as shown in FIG. 3.

In accordance with my invention, I provide means for effectively clamping and securing the chipbreaker and the cutting element to the tool shank. Downward clamping pressure is obtained by use of a clamping member, indicated generally at 40, adapted to be positioned on the upper surface of the tapered forward portion 11 of the tool body. The clamping member is provided with a slight undercut at 42 to prevent interference with the chipbreaker which, as can be seen in FIG. 3, projects slightly above the upper surface at the tool holder. Slightly rearwardly of the undercut portion 42 is a smooth hole 44 extending transversely through the clamping member from top to bottom. The hole is provided with a countersink 46, on the upper surface of the clamping member, the bottom surface 48 of which is inclined with respect to the upper surface of the member. The direction of the surface incline is towards the undercut portion 42, or forwardly of the tool holder. A bushing 50 having its lower surface 51 inclined at the same angle as the countersink surface 48 is provided to fit in the countersink with the inclined surfaces in abutment, being retained therein by means of a bolt 52 adapted to engage a threaded hole 53 in the tool body. Finally, a smooth hole 54 is provided in the forward or tapered portion 55 of the clamping member which is adapted to be aligned with bores 31 and 34 in the chipbreaker and bit, respectively, for a purpose hereinafter described. The clamping member 40 is truncated at 56 and 57 to prevent its interfering with the cutting operation, as is best seen in FIG. 2.

To assemble the cutting tool shown in FIGS. 1 through 3, the seat plate 16 is first affixed to the recess platform surface 14. The cutting element 26 is then placed in the pocket with one set of paired faces being in close contact with the walls 22—22. After the chipbreaker 32 is in place and the bores 31 and 34 in alignment, a pin 58 which is of sufficient length to extend through both bores, is press-fitted into the smooth hole 54 in the clamping member. The member is then set down on top of the tool holder with the pin being received in the aligned bores. With the inclined surfaces 48 and 51 of the countersink and bushing, respectively, placed in continuous abutment, the clamping bolt 52 is inserted through the bushing and into engagement with the threaded hole 53. As the bolt is tightened, due to the relationship between the surfaces 48 and 51, the clamping member 40 is forced rearwardly of the tool body. This movement applies a rearward pressure to the pin 58 which results in the bit being wedged rearwardly into the pocket. Thus the combination of the downward pressure of the clamping member and the backward pressure caused by the lever-like wedging action of the pin enables the cutting element to be positively held in the recess. For this reason the included angles 28—28 can be reduced to as little as 35° between paired cutting faces. As mentioned above, an included angle of this size has hitherto been thought impossible because means were not available to insure that slippage of a cutting element of this size would not occur during difficult contour cuts. The combination of the recess, having walls converging at the same angle as the cutting element included angle, and wedging means acting on the element, insures that slippage will not occur even under the most difficult cutting operations.

FIG. 4 illustrates a further embodiment of my improved cutting tool. A clamping member 60 having a hole 61 is provided into which a clamping bolt 62 is inserted to enable the clamp to be tightened down. A seat plate 64 having a smooth bore 65 is also provided, the plate being adapted to be placed in a recess 66 in the tool shank. A cutting element adapted to be positioned on the seat plate is shown at 68. The element has a bore 69 of slightly larger dimension than the seat plate bore adapted to be placed in axial alignment with the latter. Secured to the clamp by means of a set screw 70 is a chipbreaker 72, which also may be permanently attached to the clamp.

In this embodiment the cutting element is securely retained in the desired position by means of a specially-designed bolt indicated generally at 74. The bolt has an enlarged head portion 75 containing a cam 76 which when turned is adapted to be forced into abutment with the wall of the enlarged bore 69 in the cutting element. As the cam is turned the element is forced backward into the recess 66. The bolt is held in place by being threadably engaged in a hole 77 in the tool holder after it has been inserted through the seat plate bore. A shoulder 78 is provided on the enlarged head portion to help retain the seat plate. This embodiment has the advantage that even if pressure would cause the chipbreaker to move, the cutting element will be unaffected.

FIG. 6 is a schematic diagram showing the different directions a cutting tool might take in machining a typical contoured part. The diagram helps to illustrate why my invention is a distinct improvement over tools presently on the market wherein the included angle of the cutting element is at least 55°. For example, many parts today have surfaces which cannot be machined with such ordinary triangular, square, or rectangular shaped clamp-on tool bits because (1) the parts have contours which result in "feeding out" forces acting on the cutting element, i.e., forces acting in the direction shown by the middle arrow in FIG. 6 tend to pull the element out of its pocket, or (2) the tolerances are too close and the clearances too slight, e.g., where a 90° turn is involved, to physically permit use of such larger tools. However, due to the positive holding action described above, my novel tool holder and 35° cutting element may successfully be used for the type of cutting operation illustrated in FIG. 6 without danger of the slightest movement of the bit upsetting the indexing or tolerances.

Another advantage of my tool is that old, worn cutting elements can readily be adapted to chipbreaker use without additional cost. In addition, the fact that the element has four cutting edges reduces the cost to as little as 25% of the cost per cut when using prior art cutting tools having only a single cutting edge. Furthermore, when a new cutting edge is required, the operator need only loosen the clamp and the bit can be flipped over or reverse-ended. Since the tool holder itself does not have to be moved and since the bit is symmetrical, with either end being designated to mate with the recess walls, there is no need to re-calibrate the machine; consequently, there is a considerable saving of time with use of my device.

From the above description, it is clear that I have provided a versatile and economical cutting tool and for the first time have made practical the use of a cutting element having an included angle of no more than 35°. I also have provided an improved positive holding action for clamping a disposable bit in a tool holder which will allow the tool to be used for intricate cuts wherein longitudinal forces would otherwise tend to force the cutting element out of its recess in the holder.

While particular embodiments of the invention with modifications have been illustrated and described these should not be construed as limitations and it is intended to cover all changes and modifications which may be made within the scope and spirit of the invention as defined in the following claims.

I claim:

1. An improved cutting tool comprising in combination: a cutting element holder having an element-receiving recess in the forward portion thereof, said recess being defined by a flat, horizontal platform surface and a pair of rearwardly-convergent vertical walls, the included angle between said walls being approximately 35°; a flat seat plate received in said recess, said seat plate being removably attached to said platform surface; a diamond-shaped cutting element of rectangular cross-section, having a pair of convergent surfaces complemental to said vertical recess walls, received in said recess and positioned on the upper surface of said seat plate; a clamping member releasably holding said cutting element in said recess, said member including a tapered forward portion; a chipbreaker removably attached to the lower surface of said forward portion of said clamping member and operative to engage the upper surface of said cutting element; screw means detachably securing said clamping member to said holder, said screw means causing said member to exert downward pressure on said element through said chipbreaker; and wedging means comprising a bolt received in a bore in said element, said bolt being threadably engaged with a hole in the platform surface of said recess and having an off-center cam surface adapted to engage the wall of the element bore to urge the element rearwardly in the recess and into close abutment with said recess walls, said cammed bolt and said clamping member combining to securely hold said element in a cutting position.

2. An improved cutting tool comprising in combination: a cutting element holder having an element-receiving recess in the forward portion thereof, said recess being defined by a flat, horizontal platform surface and a pair of rearwardly-convergent vertical walls, the included angle between said walls being approximately 35°; a cutting element having a pair of convergent surfaces complemental to said vertical recess walls adapted to fit in said recess; a clamping member releasably holding said element in said recess, said member including a forward portion operative to exert downward pressure on said element; detachable means securing said clamping member to said holder; and wedging means comprising a bolt received in a bore in said element, said bolt being threadably engaged with a hole in the platform surface of said recess and having an off-center cam surface adapted to engage the wall of the element bore to urge the element rearwardly in the recess and into close abutment with said recess walls, said cammed bolt and said clamping member combining to securely hold said element in a cutting position.

References Cited in the file of this patent
UNITED STATES PATENTS

| | | |
|---|---|---|
| 2,627,106 | Sheridan | Feb. 3, 1953 |
| 2,677,170 | Kuns | May 4, 1954 |
| 2,870,523 | Richard | Jan. 27, 1959 |
| 2,949,662 | Cook | Aug. 23, 1960 |
| 2,999,301 | Conti | Sept. 12, 1961 |